US008590926B2

(12) United States Patent
Saimura et al.

(10) Patent No.: US 8,590,926 B2
(45) Date of Patent: Nov. 26, 2013

(54) CURTAIN AIRBAG SYSTEM

(75) Inventors: Kazuya Saimura, Susono (JP);
Shunichi Katsumata, Susono (JP);
Hitoshi Kawabe, Kiyosu (JP)

(73) Assignees: Toyota Jidosha Kabushiki Kaisha,
Toyota-shi (JP); Toyoda Gosei Co., Ltd.,
Kiyosu-shi (JP)

( * ) Notice: Subject to any disclaimer, the term of this patent is extended or adjusted under 35 U.S.C. 154(b) by 0 days.

(21) Appl. No.: 13/479,988

(22) Filed: May 24, 2012

(65) Prior Publication Data

US 2012/0299275 A1 Nov. 29, 2012

(30) Foreign Application Priority Data

May 24, 2011 (JP) .................................. 2011-115915

(51) Int. Cl.
*B60R 21/232* (2011.01)
(52) U.S. Cl.
USPC ...................... 280/730.2; 280/742; 280/743.1
(58) Field of Classification Search
USPC .............. 280/728.1, 728.2, 730.2, 743.1, 742
See application file for complete search history.

(56) References Cited

U.S. PATENT DOCUMENTS

| | | | |
|---|---|---|---|
| 6,199,898 B1 * | 3/2001 | Masuda et al. ............. | 280/730.2 |
| 6,394,487 B1 * | 5/2002 | Heudorfer et al. ............ | 280/729 |
| 6,616,179 B2 | 9/2003 | Tanase et al. | |
| 7,658,402 B2 * | 2/2010 | Ohba ........................ | 280/730.2 |
| 7,775,553 B2 | 8/2010 | Takemura et al. | |
| 8,025,309 B2 * | 9/2011 | Steinbach et al. ......... | 280/730.2 |
| 8,141,899 B2 * | 3/2012 | Arima et al. ............... | 280/730.2 |
| 8,186,710 B2 * | 5/2012 | Cheal et al. ................ | 280/730.2 |
| 8,353,530 B2 * | 1/2013 | Czach et al. ............... | 280/730.2 |
| 2003/0222437 A1 | 12/2003 | Tanaka | |
| 2006/0125213 A1 * | 6/2006 | Kruse ........................ | 280/730.2 |
| 2008/0012275 A1 * | 1/2008 | Pinsenschaum et al. .. | 280/730.2 |
| 2008/0290634 A1 * | 11/2008 | Sugimori et al. .......... | 280/728.2 |
| 2010/0025971 A1 * | 2/2010 | Steinbach et al. ............ | 280/729 |
| 2012/0248751 A1 | 10/2012 | Kato et al. | |

FOREIGN PATENT DOCUMENTS

| | | |
|---|---|---|
| JP | 2001-171471 A | 6/2001 |
| JP | 2002-046567 A | 2/2002 |
| JP | 2003-267179 A | 9/2003 |
| JP | 3799522 B | 7/2006 |
| JP | 4550729 B | 6/2007 |
| JP | 2007-216819 A | 8/2007 |
| JP | 2010-215096 A | 9/2010 |
| JP | 4550729 B | 9/2010 |
| JP | 4611882 B | 1/2011 |

(Continued)

*Primary Examiner* — Joseph Rocca
*Assistant Examiner* — Timothy Wilhelm
(74) *Attorney, Agent, or Firm* — Gifford, Krass, Sprinkle, Anderson & Citkowski, P.C.

(57) ABSTRACT

A curtain airbag of a curtain airbag system includes a gas supply passage that extends in a longitudinal direction in an upper portion of the airbag and guides gas from an inflator toward the front of the vehicle, a front main chamber deployed downward in the event of a side impact or rollover when supplied with gas from the gas supply passage, a front auxiliary chamber deployed when supplied with gas from the gas supply passage or the front main chamber at least in the event of rollover, and an uninflatable portion (gas-flow guide portion) that blocks forward gas flow at a front side of a gas passage communicating with the gas supply passage and the front main chamber, and guides the gas to the front main chamber.

8 Claims, 6 Drawing Sheets

(56) References Cited

FOREIGN PATENT DOCUMENTS

| | | | |
|---|---|---|---|
| JP | 2012201312 A | 10/2012 | |
| WO | 2007055420 A1 | 5/2007 | |
| WO | WO2007/055420 | 5/2007 | |
| WO | 2008-065965 A1 | 6/2008 | |
| WO | WO2008/065965 | 6/2008 | |

* cited by examiner

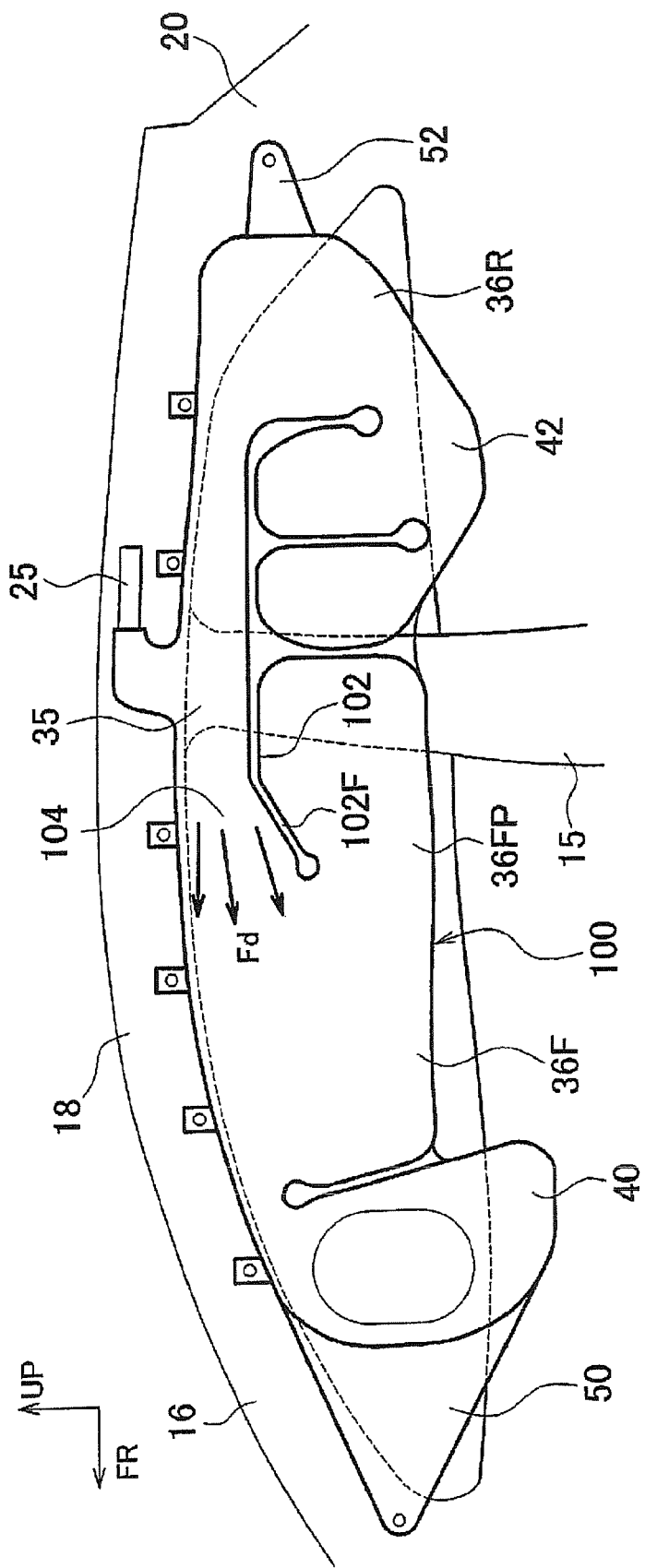

CURTAIN AIRBAG SYSTEM

CROSS REFERENCE TO RELATED APPLICATIONS

This application claims priority to Japanese Patent Application No. 2011-115915 filed on May 24, 2011, which is incorporated herein by reference in its entirety including the specification, drawings and abstract.

BACKGROUND OF THE INVENTION

1. Field of the Invention

The invention relates to a curtain airbag system.

2. Description of Related Art

A curtain airbag system is known which includes a main inflatable portion provided at a seating location at which an occupant is seated, and an auxiliary inflatable portion that is constantly in fluid communication with the main inflatable portion via a reduced-diameter portion and is located off the occupant seating location (see, for example, Japanese Patent Application Publication No. 2007-161163 (JP 2007-161163 A)). It is also known to provide a curtain airbag with a second deployment portion that extends below the belt line, at a location other than the occupant seating location (see, for example, Japanese Patent Application Publication No. 2007-161167 (JP 2007-161167 A)).

When the curtain airbag is designed to protect an occupant against rollover, the volume of the curtain airbag becomes larger than that of an airbag exclusively used for protection against side impact. In this case, if the capacity of the inflator is increased so that the curtain airbag can be deployed in a short time upon a side impact, a large load is likely to be applied to the head of the occupant when the curtain airbag strikes the head in the course of its deployment.

SUMMARY OF THE INVENTION

The invention provides a curtain airbag system having an airbag including first and second deployment portions, wherein the velocity of flow of gas directed downward in the vehicle in the course of deployment of the first deployment portion can be reduced or kept low.

A curtain airbag system according to one aspect of the invention includes an inflator that generates gas, and a curtain airbag that is stored in a folded state in an upper edge portion of an opening of a vehicle body through which a passenger gets in or off, and is operable to be inflated with gas supplied from the inflator, and deployed downward from the upper edge portion of the opening of the vehicle body. In the curtain airbag system, the curtain airbag includes a gas supply passage that is deployed in a cylindrical shape that extends in a longitudinal direction of the vehicle, along the upper edge portion of the opening, in the event of a side impact or rollover of the vehicle, so as to guide at least a part of the gas supplied from the inflator, toward the front of the vehicle, a first deployment portion to which gas is supplied from the gas supply passage in the event of a side impact or rollover of the vehicle, so that the first deployment portion is deployed downward in a vertical direction of the vehicle, so as to cover a region below the gas supply passage and above a belt line of the vehicle, a second deployment portion to which gas is supplied from the inflator at least in the event of rollover of the vehicle, so that the second deployment portion is deployed at a vehicle front side of the first deployment portion, such that a lower end portion of the second deployment portion is located below the belt line, and a gas-flow guide portion located at the vehicle front side of a communicating portion that communicates with the gas supply passage and the first deployment portion, and operable to block gas flowing toward the front of the vehicle through the gas supply passage, and guide the gas toward the first deployment portion.

In the curtain airbag system according to the above aspect of the invention, upon occurrence of a side impact of the vehicle, at least the first deployment portion is supplied with gas and is deployed, so that the head of the occupant is protected by the first deployment portion, against the side impact. On the other hand, upon occurrence of rollover of the vehicle, the first deployment portion and the second deployment portion are deployed, and outward movement of the head of the occupant in the vehicle width direction can be restricted by the first and second deployment portions, over a wide range as viewed in the longitudinal direction of the vehicle.

In the curtain airbag system, when the first deployment portion is inflated and deployed, at least a part of gas supplied from the inflator is directed toward the front of the vehicle through the gas supply passage, and the gas directed toward the front of the vehicle is blocked by the gas-flow guide portion, to be guided toward the first deployment portion. With this arrangement, the gas is supplied to the first deployment portion through the communicating portion between the gas supply passage and the first deployment portion, and the first deployment portion is inflated and deployed as described above. Therefore, the velocity of flow of gas supplied to the first deployment portion is reduced, as compared with an arrangement in which gas is supplied from the gas supply passage directly to the first deployment portion.

Thus, in the curtain airbag system according to the above aspect of the invention, in which the airbag includes the first and second deployment portions, the velocity of flow of gas directed downward in the course of deployment of the first deployment portion can be reduced or kept low. Consequently, even in the case where the first deployment portion strikes the head of the occupant in the course of its deployment, the load applied to the occupant can be reduced.

In the curtain airbag system according to the above aspect of the invention, the first deployment portion may include a front-seat development portion operable to be deployed in a cylindrical shape that extends in the longitudinal direction of the vehicle, at one side of an occupant seated in a front seat of the vehicle and above the belt line, such that a rear end portion of the first deployment portion overlaps a center pillar as seen in a side view.

In the curtain airbag system constructed as described above, a rear end portion of the front-seat deployment portion (first deployment portion) that is deployed into a cylindrical shape that extends in the longitudinal direction of the vehicle engages with the center pillar, so that reaction force for restricting outward movement of the head of the occupant in the vehicle width direction in a rollover situation is favorably supported. Also, a lower end portion of the second deployment portion located below the belt line engages with a side door, so that reaction force for restricting outward movement of the head of the occupant in the vehicle width direction in a rollover situation is favorably supported. With these arrangements, the protection performance with which the head of the front-seat occupant is protected is improved.

In the arrangement in which the gas-flow guide portion is in the form of an uninflatable portion, the thickness of deployment of the first deployment portion is limited by the uninflatable portion.

In the curtain airbag system according to the above aspect of the invention, the gas-flow guide portion may be located above the first deployment portion, such that at least a part of the gas-flow guide portion projects downward beyond an imaginary line that extends from a lower end of the gas supply passage in the longitudinal direction of the vehicle. Also, the gas-flow guide portion may be in the form of an uninflatable portion of the curtain airbag which is not inflated with gas supplied from the inflator.

In the curtain airbag system constructed as described above, the uninflatable portion is formed by sewing a foundation cloth of the airbag, for example, and the uninflatable portion thus formed provides the gas-flow guide portion that blocks gas directed toward the front of the vehicle and guides the gas toward the first deployment portion. Thus, the gas-flow guide portion can be formed without increasing the gas volume of the airbag as a whole.

In the curtain airbag system as described above, the uninflatable portion may include an edge portion adjacent to the gas supply passage, and the edge portion may be formed in a semicircular shape as seen in a side view.

In the curtain airbag system constructed as described above, since the end portion of the uninflatable portion which blocks gas flow assumes an arc-like (or semicircular) shape, stress concentration on the gas-flow guide portion is mitigated or prevented.

In the curtain airbag system as described above, the curtain airbag may further include an inflatable portion operable to be inflated with gas supplied thereto, at a location above the uninflatable portion and at the front side of the communicating portion that communicates with the gas supply passage and the first deployment portion, so that the inflatable portion and the gas supply passage overlap the upper edge portion of the opening as seen in a side view.

In the curtain airbag system constructed as described above, the inflatable portion located above the uninflatable portion and the gas supply passage engage with the upper edge of the opening through which passengers get in or off, at the front side of the communicating portion between the gas supply passage and the first deployment portion. Therefore, in the arrangement in which the uninflatable portion is formed as the gas-flow guide portion, a portion of the airbag which engages with the upper edge portion of the opening of the vehicle body can be formed with a large longitudinal length or dimension.

As explained above, the curtain airbag system according to the above aspect of the invention, in which the airbag includes the first and second deployment portions, provides an excellent effect of reducing the velocity of flow of gas directed downward in the course of deployment of the first deployment portion.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 6 is a side view showing a curtain airbag system according to a third comparative example, as seen from the interior of the vehicle.

DETAILED DESCRIPTION OF EMBODIMENTS

A curtain airbag system 10 according to one embodiment of the invention will be described with reference to FIG. 1 through FIG. 4. Arrows FR, UP, IN and OUT denoted in FIG. 1-FIG. 4 as needed represent the front direction (travelling direction), upward direction, inward as viewed in the vehicle width direction, and outward as viewed in the vehicle width direction, respectively, of an automobile V equipped with the curtain airbag system 10. When longitudinal and vertical directions are referred to in the following description, they are supposed to represent the longitudinal direction and vertical direction of the vehicle, respectively, unless otherwise specified.

Figure 1:
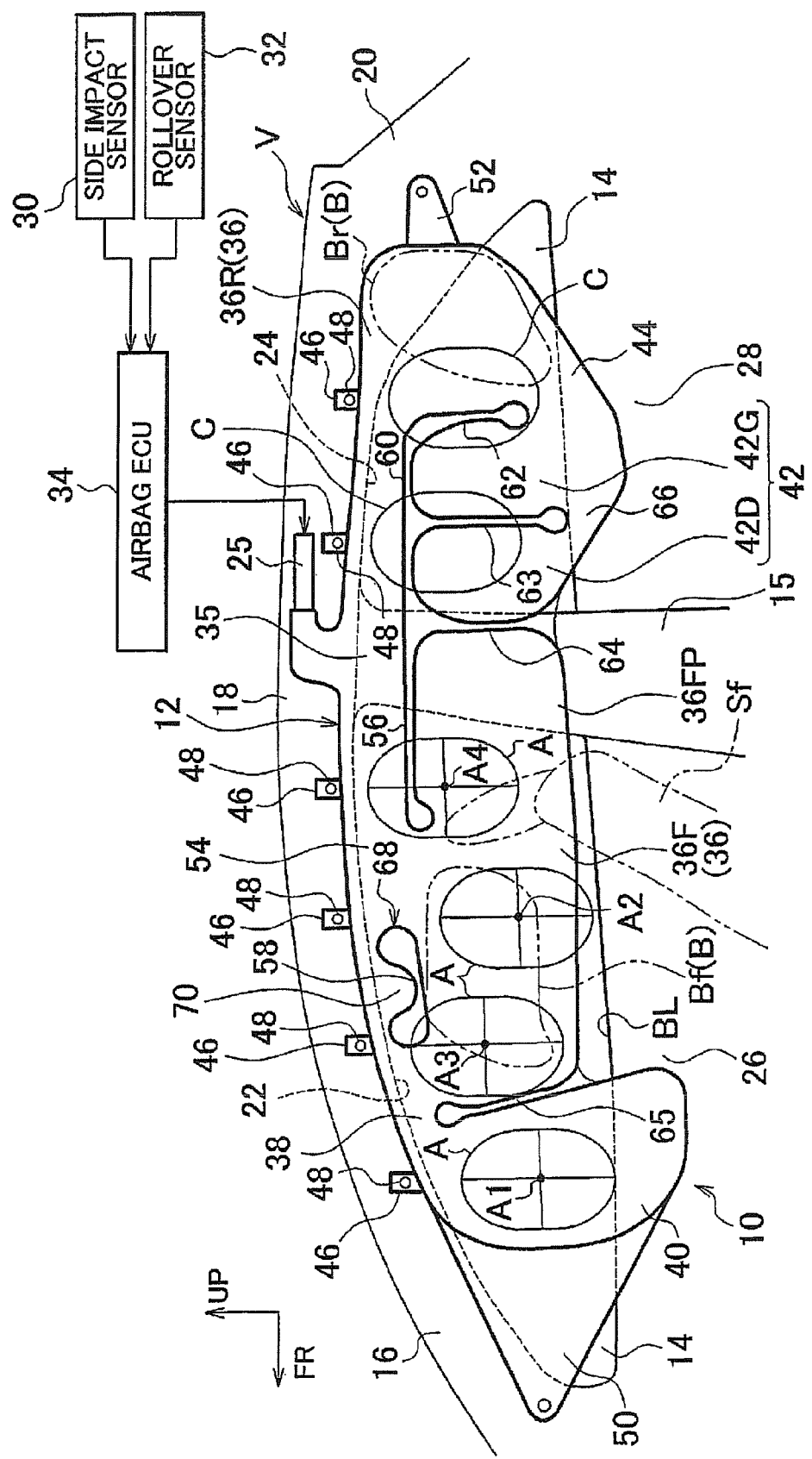
FIG. 1 is a side view as seen from the interior of the vehicle, schematically showing the overall construction of a curtain airbag system according to one embodiment of the invention.

FIG. 1 is a side elevation view showing the curtain airbag system 10 when viewed from the vehicle interior or compartment of the automobile V equipped with the system 10. As shown in FIG. 1, the curtain airbag system 10 includes a curtain airbag 12 as an airbag. The curtain airbag 12 is formed so as to be deployed like a curtain, along vehicle interior sides of side windshields 14, and a vehicle interior side of a center pillar (or B pillar) 15. In this embodiment, the curtain airbag 12 is configured to cover the front and rear side windshields 14 located on one side of a front seat and a rear seat.

Although not illustrated in the drawings, the curtain airbag 12 is rolled or accordion-folded into a cylindrical shape, for example, and then stored along a front pillar (or A pillar) 16 and a roof side portion 18 until it comes close to a rear pillar 20. As will be described later, the curtain airbag 12 is deployed along the front and rear side windshields 14 and the center pillar 15, as shown in FIG. 1, so as to protect the heads of occupants seated in the front seat and rear seat. In this embodiment, a front door opening 22 serving as an opening through which passengers are getting in or off is surrounded or defined by the roof side portion 18, front pillar 16, and the center pillar 15, and a rear door openings 24 serving as an opening through which passengers are getting in or off is surrounded or defined by the roof side portion 18, center pillar 15 and the rear pillar 20. The roof side portion 18 forms upper edges of the front and rear door openings 22, 24. The curtain airbag 12 is stored between a roof side rail and a roof headlining which constitute the roof side portion 18.

The curtain airbag system 10 includes an inflator 25 for supplying gas into the curtain airbag 12. The inflator 25, which is of a combustion type or cold-gas type, is operated to generate gas, and supply the gas into the curtain airbag 12. A gas port of the inflator 25 communicates with the interior of the curtain airbag 12. In this embodiment, the inflator 25 is installed in the roof side portion 18. The shape of the deployed curtain airbag 12 and the location of the inflator 25 will be described later.

The curtain airbag 12 and the inflator 25 as described above are provided at each of the opposite sides of the automobile V as viewed in the vehicle width direction. Namely, the curtain airbag system 10 includes a pair of right and left curtain airbags 12, and a pair of inflators 25. Further, the curtain airbag system 10 includes an airbag ECU 34 electrically connected to a side impact sensor 30 and a rollover sensor 32, as shown in FIG. 1. The side impact sensor 30 is configured to predict or detect a side impact of the automobile V (or its unavoidableness), and generate a side-impact detection signal to the airbag ECU 34. The rollover sensor 32 is configured to predict or detect rollover of the automobile V (or its unavoidableness), and generate a rollover detection signal (which will be called "R/O detection signal") to the airbag ECU 34.

The airbag ECU 34 is electrically connected to each of the right and left inflators 25. In FIG. 1, the airbag ECU 34 is connected to only one of the inflators 25. The airbag ECU 34 is configured to operate the inflator 25 on the side-impact side (which will be called "near side") when it receives a side-impact detection signal. Thus, when a side impact occurs to the automobile V, the curtain airbag 12 on the near side is inflated with gas supplied thereto, and is deployed. The airbag ECU 34 is also configured to operate the inflators 25 on the opposite sides as viewed in the vehicle width direction, when it receives an R/O detection signal. When receiving an R/O detection signal after a side impact, the airbag ECU 34 operates the inflator 25 opposite to the side-impact-side inflator 25 that has already been operated.

In the following, the construction of the curtain airbag 12 will be specifically described. Unless otherwise noted, the construction (or shape) of the curtain airbag 12 that is in an inflated or deployed condition will be described. As shown in FIG. 1, the curtain airbag 12 includes a gas supply passage 35, a main chamber 36 as a first deployment portion, a front auxiliary chamber 40 that communicates with the main chamber 36, and a rear auxiliary chamber 42 that communicates with the main chamber 36. In this embodiment, at least one of the front auxiliary chamber 40 and the rear auxiliary chamber 42 functions as a second deployment portion.

The gas supply passage 35 is arranged to be deployed into a cylindrical shape that extends in the longitudinal direction along the roof side portion 18, and the inflator 25 is connected to a middle portion of the gas supply passage 35 as viewed in the longitudinal direction, such that gas can be supplied from the inflator 25 into the gas supply passage 35. Thus, the gas supply passage 35 is arranged to supply gas from the inflator 25 to each portion of the curtain airbag 12 while distributing the gas in the longitudinal direction. In this connection, the inflator 25 may be installed on the center pillar 15 or rear pillar 20 (or C pillar or D pillar).

The main chamber 36 is arranged to be inflated and deployed in a head protection area (see regions B as indicated in FIG. 1) in which the head of an occupant is to be protected against a side impact. More specifically, the main chamber 36 includes a front main chamber 36F as a deployment portion for the front seat, and a rear main chamber 36R as a deployment portion for the rear seat. The front main chamber 36F is inflated and deployed in a region including a head protection area Bf in which the head of an occupant seated in the front seat is to be protected against a side impact. The rear main chamber 36R is inflated and deployed in a region including a head protection area Br in which the head of an occupant seated in the rear seat is to be protected against a side impact.

The front main chamber 36F and the rear main chamber 36R communicate with each other through the gas supply passage 35, such that gas is supplied from the inflator 25 to the front and rear main chambers 36F, 36R via the gas supply passage 35.

The front auxiliary chamber 40 is arranged to be deployed at the front side of the front main chamber 36F, to thus form a front-end portion of the curtain airbag 12, and serves to protect the head of a front-seat occupant at the front side of the front seat in a rollover event. When seen in a side view, an upper end portion of the front auxiliary chamber 40 overlaps the front pillar 16, and its lower end portion is located below the belt line BL and overlaps a front portion of a front side door 26 as a side door.

Figure 3:
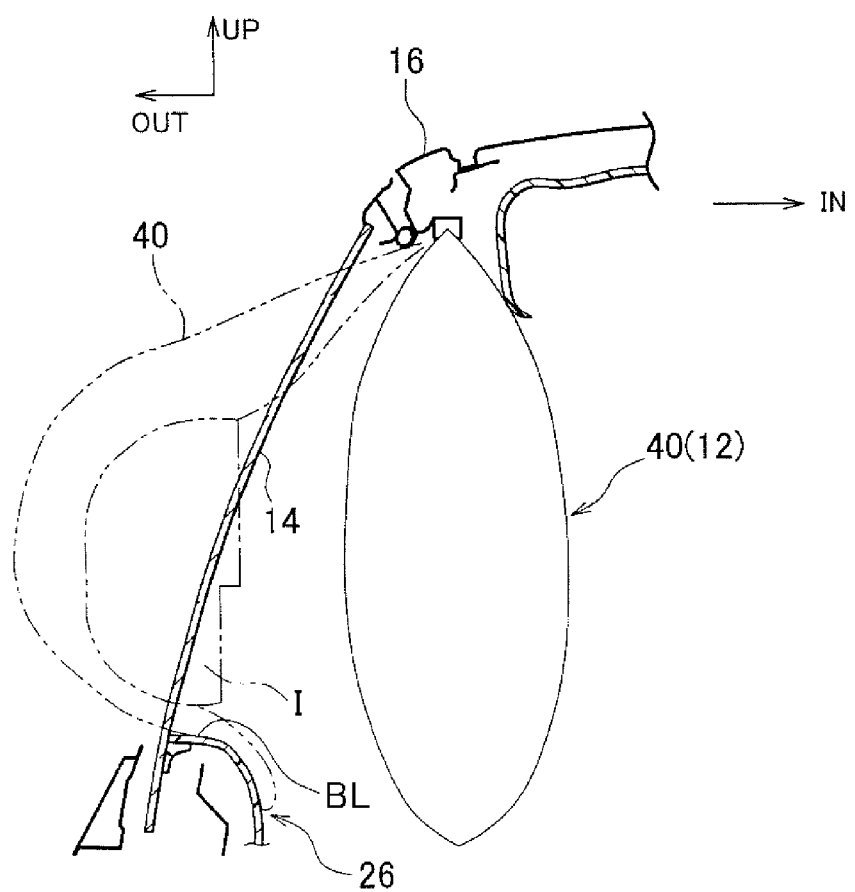
FIG. 3 is an enlarged cross-sectional view showing a cross-sectional shape of a front auxiliary chamber that constitutes the curtain airbag system of the embodiment of FIG. 1, taken in a plane perpendicular to a longitudinal direction of the vehicle.

In this embodiment, an upper portion of the front auxiliary chamber 40 communicates with the front end of the gas supply passage 35 deployed along the roof side portion 18, via a restrictor channel 38 of the curtain airbag 12. As shown in FIG. 3, which is a cross-section as viewed from the front, the front auxiliary chamber 40 is arranged to be deployed into a (vertically long) generally cylindrical shape having a center axis that extends in the vertical direction. In operation, gas is supplied from the inflator 25 to the front auxiliary chamber 40, via the gas supply passage 35, and the front main chamber 36F. Alternatively, gas may be supplied from the inflator 25 to the front auxiliary chamber 40, independently of the front main chamber 36F, using an inner tube, or the like, that is passed through the gas supply passage 35. In other words, gas may be supplied from the inflator 25 in parallel to the front main chamber 36F and the front auxiliary chamber 40.

Regions A indicated by thin solid lines in FIG. 1 represent test points which an impactor I (see FIG. 3) corresponding to the head of an occupant in a front seat strikes in a rollover test according to FMVSS No. 226 standard. The above-mentioned test point will also be called "impactor striking point" or "impact point". In the curtain airbag 12, the most anterior test point obtained in the above rollover test is covered by the front auxiliary chamber 40, and other test points for the front-seat occupant in the rollover test are covered by the front main chamber 36F.

The rear auxiliary chamber 42 is deployed at the front side of the rear main chamber 36R, to thus form a portion between the rear main chamber 36R and the front main chamber 36F. In this embodiment, the rear auxiliary chamber 42 communicates at its lower end portion with a front lower portion of the rear main chamber 36R, via a gas passage 44. Also, in this embodiment, the front end of the rear auxiliary chamber 42 is separated by a seam 64 (which will be described later), from a rear end portion of the front main chamber 36F.

Furthermore, the rear auxiliary chamber 42 is linked (connected) at its upper end portion to a lower edge portion of the gas supply passage 35 via a seam 60 (which will be described later), and is arranged to be deployed such that a lower end portion of the rear auxiliary chamber 42 overlaps a rear side door 28. The rear auxiliary chamber 42 serves to protect the head of a rear-seat occupant at the front side of the rear seat in a rollover event.

More specifically, regions C indicated by thin solid lines in FIG. 1 represent test points (impact points) which an impactor I strikes in a rear seat in a rollover test according to FMVSS No. 226 standard. In the curtain airbag 12, the most anterior test point in the rear seat obtained in the above rollover test is covered by the rear auxiliary chamber 42. At the most anterior test point, a lower end portion of the rear auxiliary chamber 42 whose upper end is connected to the gas supply passage 35 engages with (abuts on) the rear side door 28, so as to restrict or curb outward displacement of the head of an occupant in the vehicle width direction in a rollover event. The most posterior test point for the rear-seat occupant in the above rollover test is covered by the rear main chamber 36R and the rear auxiliary chamber 42. In FIG. 1, a middle test point is not illustrated.

As shown in FIG. 1, the curtain airbag 12 is provided with a plurality of mounting tabs 46 arranged along an upper edge of the curtain airbag 12. The mounting tabs 46 of the curtain airbag 12 are fixed to the vehicle body framework (including the front pillar 16, roof side portion 18, and the rear pillar 20), by means of fixtures 48, such as clips or bolts and nuts, which extend through the respective tabs 46.

The front end of the curtain airbag 12 as described above, or the front auxiliary chamber 40, is supported by a lower portion of the front pillar 16 via a support cloth 50 (tension cloth) having a generally triangular shape as seen in a side view. Also, the rear end of the curtain airbag 12, or the rear main chamber 36R, is supported by the rear pillar 20 via a support cloth 52.

In the curtain airbag 12, a surface of a foundation cloth that forms at least the front auxiliary chamber 40 is subjected to weave texture sealing, such as silicon coating, so that the internal pressure of the chamber 40 is likely to be maintained. In this embodiment, silicon coating is applied to surfaces of foundation cloths that form the front auxiliary chamber 40 and the rear auxiliary chamber 42.

The front main chamber 36F of the curtain airbag 12 as described above is arranged to be deployed into a cylindrical shape that extends in the longitudinal direction, above the belt line BL. The construction of the front main chamber 36F will be specifically described.

Figure 2:
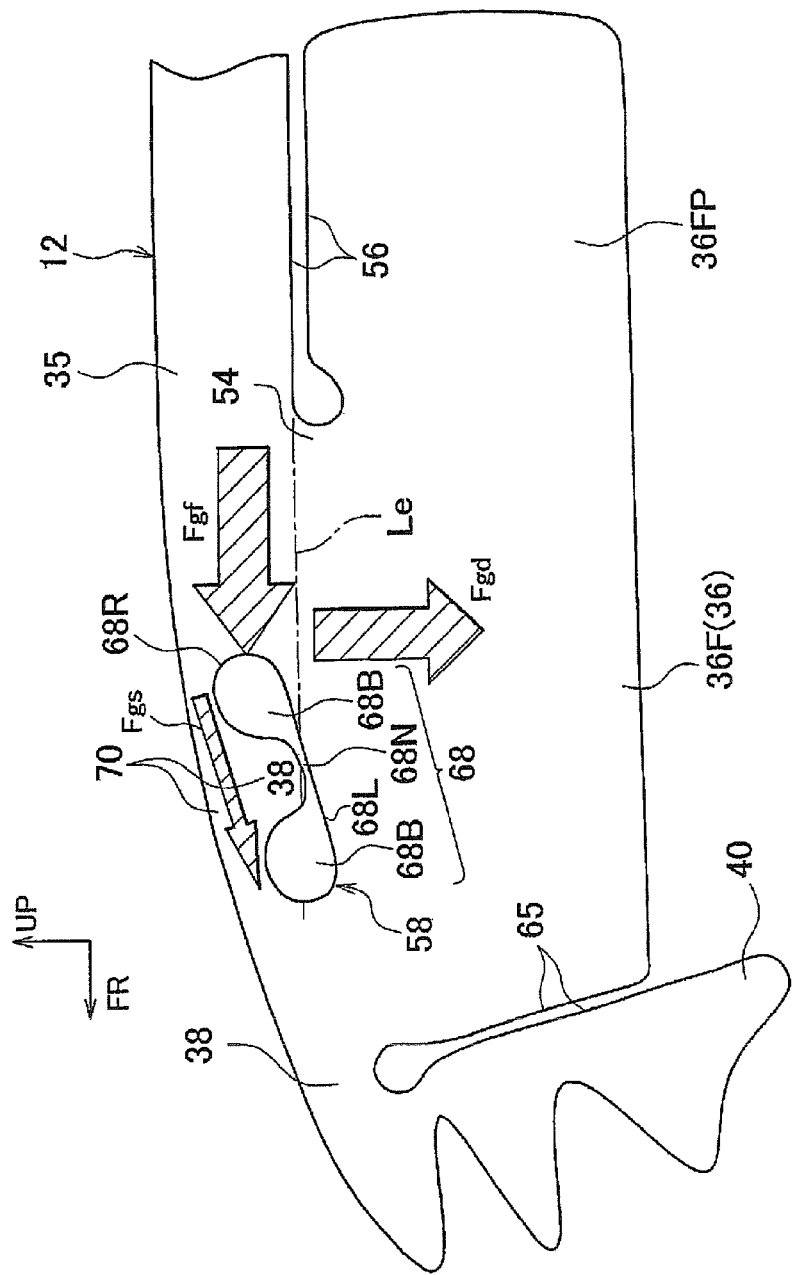
FIG. 2 is an enlarged side view showing in enlargement a principal part of a curtain airbag that constitutes the curtain airbag system of the embodiment of FIG. 1.

As shown in FIG. 1 and FIG. 2, the front main chamber 36F is disposed below the gas supply passage 35 that extends along the roof side portion 18 and reaches the front auxiliary chamber 40. The front main chamber 36F is arranged to receive gas supplied from the gas supply passage 35, through a gas passage 54 located in a generally middle portion of the chamber 36F as viewed in the longitudinal direction. The gas supply passage 35 and the front main chamber 36F are separated (or partitioned) by seams 56, 58, at the front and rear sides of the gas passage 54.

The rear seam 56 is continuous with the seam 60 that separates the gas supply passage 35 from the rear auxiliary chamber 42, a seam 62 that separates the rear main chamber 36R from the rear auxiliary chamber 42, a seam 63 that separates a delay chamber 42D from a general portion 42G (which will be described later), and the seam 64 that separates the rear auxiliary chamber 42 from the front main chamber 36F. On the other hand, the front seam 58 is disposed between the upper end of a seam 65 that separates the front auxiliary chamber 40 from the front main chamber 36F and the front end of the seam 56, to be spaced apart from the seams 65, 56. Namely, the seam 58 is formed (located) like a floating island.

As described above, the front main chamber 36F is arranged to be deployed in a longitudinally long, cylindrical shape, below the gas supply passage 35, i.e., below the seams 56, 58. A rear end portion of the front main chamber 36F provides a pillar overlapping portion 36FP that overlaps the center pillar 15 as seen in a side view. The front main chamber 36F is deployed above the belt line BL (the lower edge of the front main chamber 36F is located above the belt line BL), so that the front main chamber 36F is prevented from interfering with a side airbag (not shown) that is deployed at a side of an occupant seated in the front seat Sf in the event of a side impact. The pillar overlapping portion 36FP engages with the center pillar 15 when the head of an occupant is protected against rollover, so as to support reaction force resulting from the protection.

A portion (like a floating island) of the curtain airbag 12 which is surrounded by the endless seam 58 provides an uninflatable portion 68 as a gas-flow guide portion of the main chamber 36 to which gas is not supplied. In this embodiment, (a part of) a generally straight, lower edge portion 68L of the uninflatable portion 68 which extends in the longitudinal direction protrudes downward from the lower end of the gas supply passage 35. More specifically, as shown in FIG. 2, the lower edge portion 68L of the uninflatable portion 68 protrudes downward from an extended line Le that extends forward in the longitudinal direction from the seam 56 that forms the lower end of the gas supply passage 35.

A rear end portion 68R of the uninflatable portion 68 blocks (a part of) gas that is blown out of the inflator 25 and guided forward through the gas supply passage 35 as indicated by arrow Fgf in FIG. 2, and cooperates with a rear portion of the lower edge portion 68L to guide the gas downward as indicated by arrow Fgd in FIG. 2. Namely, the uninflatable portion 68 is located at the front side of the gas passage 54, and its rear end portion 68R is arranged to block gas flowing from the inflator 25 in the direction of arrow Fgf, and guide the gas to the front main chamber 36F through the gas passage 54. In this embodiment, the rear end portion 68R (and the rear portion of the lower edge portion 68L) of the uninflatable portion 68 (seam 58) may be regarded as defining a front edge of the gas passage 54.

The rear end portion 68R of the uninflatable portion 68 as described above assumes a generally semicircular shape as seen in a side view. The uninflatable portion 68 of this embodiment has a narrow portion 68N having a reduced width as measured in the vertical direction and formed by making upper and lower segments of the seam 58 close to each other at a longitudinally middle position along the longitudinal direction, and broad portions 68B having a relatively large width as measured in the vertical direction and formed in the shape of drops at longitudinally opposite sides of the narrow portion 68N. Namely, the rear end portion 68R of the uninflatable portion 68 is a semicircular edge portion of the rear one of the broad portions 68B. In this embodiment, the narrow portion 68N is formed along the lower edge of the uninflatable portion 68, to provide a part of the generally straight, lower edge portion 68L as described above.

A portion of the gas supply passage 35 (the curtain airbag 12) located above the uninflatable portion 68 provides an inflatable portion 70 that is inflated when gas is supplied thereto. The inflatable portion 70 may be regarded as a part of the gas supply passage 35 whose front end reaches the front auxiliary chamber 40 (the restrictor channel 38). In this case, an upper portion (principal portion) of the uninflatable portion 68 is located in the gas supply passage 35, and its lower portion extends into the front main chamber 36F.

The uninflatable portion 68 with the narrow portion 68N formed at the lower side thereof has a generally U-shaped edge portion that opens upward, and the inflatable portion 70 including the inside of the U-shaped edge portion is formed. The gas supply passage 35 including the inflatable portion 70, which engages with the roof side portion 18, is adapted to support reaction force produced when the curtain airbag 12 protects the head of an occupant.

In the curtain airbag 12 of this embodiment, the front auxiliary chamber 40 is set as a delay chamber that serves as a delayed deployment portion. As described above, the front auxiliary chamber 40 is configured such that its upper end portion overlaps the front pillar 16, and its lower end portion overlaps a front portion of the front side door 26, as seen in a side view.

Also, a part of the rear auxiliary chamber 42 of the curtain airbag 12 is set as a delay chamber 42D that serves as a delayed deployment portion. More specifically, the rear auxiliary chamber 42 consists of the general portion 42G that is deployed along with the rear main chamber 36R, etc., and the delay chamber 42D. As will be described later, the ratio of the volume of a delay chamber or chambers to that of a portion(s) other than the delay chamber(s) is specified, and the presence and volume of the delay chamber 42D are determined so as to achieve the volume ratio. Accordingly, the rear auxiliary chamber 42 may not be provided with any delay chamber, or the rear auxiliary chamber 42 as a whole may be formed as a delay chamber.

With the restrictor channel 38 provided between the front auxiliary chamber 40 and the gas supply passage 35 (or front main chamber 36F), flow of gas into the front auxiliary chamber 40 is restricted in the initial period of operation of the inflator 25, and deployment of the front auxiliary chamber 40 is delayed relative to that of the main chamber 36, etc. In other words, the restrictor channel 38 is configured or designed so as to provide larger gas-flow resistance (pressure loss) than the gas passage 54, etc., so that inflation and deployment of the front auxiliary chamber 40 are delayed in time relative to those of the main chamber 36. To this end, in this embodiment, the inside diameter of the restrictor channel 38 is set to be within the range of 40 mm to 70 mm (55 mm in this embodiment).

Similarly, gas of the inflator 25 is supplied from the general portion 42G of the rear auxiliary chamber 42, to the delay chamber 42D, through a restrictor channel 66 having an inside diameter of 40 mm to 70 mm (55 mm in this embodiment), so that deployment of the delay chamber 42D is delayed relative to those of the main chamber 36 and the general portion 42G.

Figure 4:
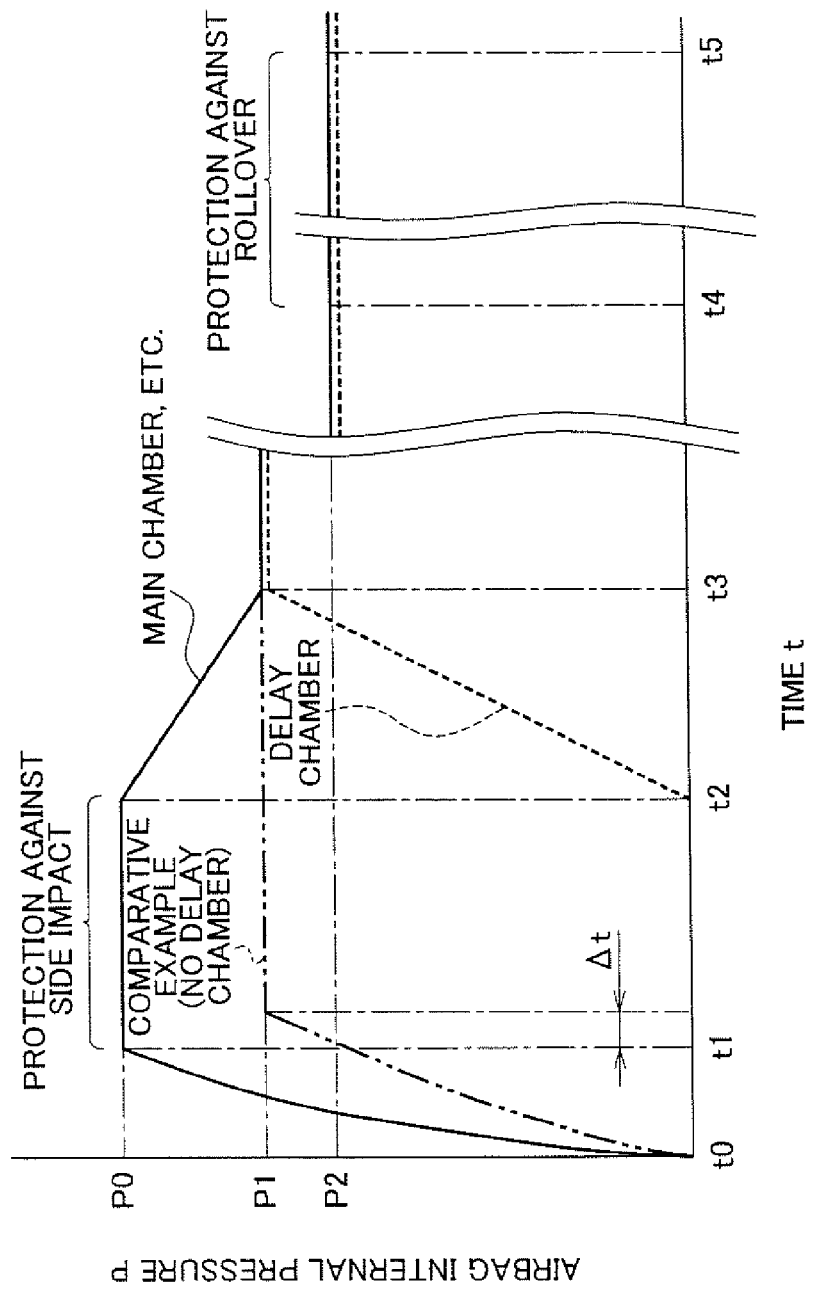
FIG. 4 is a graph indicating changes in the internal pressure of each portion of the curtain airbag that constitutes the curtain airbag system of the embodiment of FIG. 1, with time.

Here, the deployment of the curtain airbag 12 including the front auxiliary chamber 40 as a delay chamber and the delay chamber 42D will be further described with reference to FIG. 4. As shown in FIG. 4, the curtain airbag 12 is constructed so that deployment of the main chamber 36 and the general portion 42G of the rear auxiliary chamber 42 (which may be referred to as "main chamber 36, etc.") is completed at time t1, or upon a lapse of about 35 msec. from time t0 at which a side impact signal is received from the side impact sensor 30, or the inflator 25 is actuated.

In the event of a side impact, the protection of the head of an occupant using the main chamber 36 of the curtain airbag 12 is to be completed at time t2, or upon a lapse of about 100 msec. from time t0. The curtain airbag 12 is configured (or designed) so that inflation of the front auxiliary chamber 40 is substantially started at time t2. In the curtain airbag system 10, the inside diameters of the restrictor channels 38, 66 are set to be within the range of 40 mm to 70 mm as described above, so that inflation of the front auxiliary chamber 40 is started at time t2 (or about 100 msec. after time t0).

Accordingly, in the curtain airbag system 10, the front auxiliary chamber 40 and the delay chamber 42D are arranged to be inflated and deployed, after completion of occupant protection by the main chamber 36 in the even of a side impact. If rollover of the automobile V is caused by a side impact, the rollover occurs between time t0 and time t4 (about 1.5 sec. as counted from time t0)-time t5 (about 6 sec. as counted from time t0). If rollover is not caused by a side impact, in other words, if rollover occurs independently of a side impact, protection by the curtain airbag 12 is requested between the time when the rollover sensor 32 generates an R/O detection signal (or time t0 at which the inflator 25 is actuated), and the time at which about 1.5 sec.-about 6 sec. elapses from generation of the R/O signal.

Then, the curtain airbag 12 is arranged to hold its internal pressure at a required level (e.g., 25 kPa) or higher, during a period between time t0 and time t5, so as to protect the head of an occupant against rollover as described above. Also, the curtain airbag 12 is arranged to hold the inner pressure of the main chamber 36 at another required level (e.g., 40 kPa) or higher, during a period between time t0 and time t2, so as to protect an occupant against a side impact. The arrangement for keeping the internal pressure at the required level or higher during the required period is achieved by appropriately setting the volume ratio of the volume Vd as a sum of the volume of the front auxiliary chamber 40 as a delay chamber and the volume of the delay chamber 42D, to the volume Vg of the main chamber 36, etc.

More specifically, the curtain airbag 12 is configured so that Vd:Vg is within the range of 1:4 to 1:5. In other words, the volume ratio Rv (=Vd/Vt) as the ratio of the volume of the delay chamber(s) to the total volume Vt (=Vd+Vg) of the curtain airbag 12 is set to be within the range of 1/6 to 1/5. In this embodiment, Vd:Vg=1:4, namely, $1/6 \leq Rv \leq 1/5$.

The volume ratio will be further described with reference to FIG. 4. FIG. 4 schematically shows changes in the internal pressure of the curtain airbag 12 with time, but does not indicate the actual changes in the internal pressure.

As described above, for protection of the head of an occupant during a side impact (time t0 to time t2), a bag internal pressure (P0) of 40 kPa or higher, for example, is required with respect to the volume Vg of the main chamber 36 and the general portion 42G of the rear auxiliary chamber 42. On the other hand, for protection of the head of an occupant in a rollover event, a bag internal pressure (P2) of 25 kPa or higher, for example, is required with respect to the total volume of the curtain airbag 12.

In view of the fact that the internal pressure of the curtain airbag 12 is reduced by about 20% with a lapse of time from time t3 to time t4, as shown in FIG. 4, the internal pressure (P1) with respect to the total volume of the curtain airbag 12 at the time (time t3) prior to the reduction of the internal pressure is required to be equal to or higher than 31.25 kPa, which is equivalent to 125% of 25 kPa. Also, in view of the fact that the volume of the curtain airbag 12 increases from the above-indicated volume Vg by an amount corresponding to the volume Vd at time t3, the relationship that P1=P0×Vg/(Vg+Vd)=P0×Vg/Vt is established.

Accordingly, if P1=31.25 kPa, and P0=40 kPa, Vg/Vt=P1/P0≈0.8, and Vt:Vd:Vg≈5:1:4 (Vd/Vg≈1/4). When the internal pressure P2 in the event of rollover is set to be slightly larger than 25 kPa, Vd/Vt is reduced. If P2=27 kPa, for example, Vt:Vd:Vg≈6:1:5.

Thus, in the curtain airbag system 10 in which gas is supplied from a single inflator 25, the main chamber 36 is deployed at 40 kPa, for example, during a period between time t0 and time t2, and the curtain airbag 12 as a whole is deployed at an internal pressure equal to or larger than 25 kPa, for example, during a period between time t2 and time t5.

Next, the operation of the embodiment will be described.

In the curtain airbag system 10 constructed as described above, when a side impact occurs to the automobile V equipped with the airbag system 10, the airbag ECU 34 receives a side-impact detection signal from the side impact sensor 30, and actuates the inflator 25 on the side on which the side impact occurred (time t0). As a result, the curtain airbag 12 is inflated with gas supplied from the inflator 25, and the main chamber 36, i.e., the front main chamber 36F and the rear main chamber 36R, of the curtain airbag 12 is deployed (time t1). As a result, the head of an occupant seated in the front seat on the side-impact side is protected by the front main chamber 36F, and the head of an occupant seated in the rear seat on the side-impact side is protected by the rear main chamber 36R. The protection against the side impact is completed by time t2.

If rollover occurs to the automobile V, following the side impact, the airbag ECU 34 receives an R/O detection signal from the rollover sensor 32, and actuates the inflator 25 on the side opposite to the side-impact side. If, on the other hand, rollover occurs to the automobile V, independently of a side impact, the airbag ECU 34 receives an R/O detection signal from the rollover sensor 32, and actuates the inflators 25 on the right-hand and left-hand sides of the vehicle. As a result, the curtain airbags 12 are deployed at the opposite sides as viewed in the vehicle width direction, and the head of an occupant is protected against rollover (time t4-t5). It is to be noted that deployment of the front auxiliary chamber 40 as a delay chamber, and the delay chamber 42D, is completed by time t3 as counted from actuation of the inflator 25 (time t0).

When the head of a front-seat occupant is protected by the front auxiliary chamber 40 in a rollover event, the front auxiliary chamber 40 having an upper end portion that overlaps the front pillar 16 and a lower end portion that overlaps the front side door 26 restricts or curbs outward displacement of the head (impactor I) of the front-seat occupant in the vehicle width direction, with its upper end engaging with (or abutting on) the front pillar 16 and its lower end engaging with (or abutting on) the front side door 26 (see imaginary lines in FIG. 3).

In the curtain airbag system 10, the front main chamber 36F has a longitudinally long, cylindrical shape having the pillar overlapping portion 36FP at the rear end thereof; therefore, outward movement of the head of a front-seat occupant in the vehicle width direction is effectively restricted in a rollover situation. Namely, the front-seat occupant is favorably protected in a rollover situation. In particular, the front main chamber 36F is delimited by the seams 56, 58 like straight lines that extend in the longitudinal direction, at the front and rear sides of the gas passage 54, such that the seams 56, 58 provide partitions between the front main chamber 36F and the gas supply passage 35; therefore, respective longitudinally arranged portions of the front main chamber 36F have a substantially uniform cross-sectional shape. Therefore, the front main chamber 36F is less likely or unlikely to be bent in the longitudinal direction, and provides good occupant protection performance at each of the longitudinally arranged portions (including the impact points A2-A4).

In the curtain airbag system 10, the front auxiliary chamber 40 has a vertically long cylindrical shape, and is arranged to engage with the front pillar 16 and the front side door 26; therefore, outward movement of a front-seat occupant in the vehicle width direction is effectively restricted at the front end of the vehicle compartment (a portion including the impact point A1) in a rollover situation.

In the curtain airbag system 10, since the front auxiliary chamber 40 and the delay chamber 42D of the rear auxiliary chamber 42 serve as delay chambers, the main chamber 36 can be inflated and deployed in a short time in the event of a side impact. In a first comparative example in which no delay chamber is provided, as indicated by a two-dot chain line in FIG. 4, the whole curtain airbag having a volume Vt needs to be deployed, and therefore, completion of the deployment in the comparative example is delayed by Δt relative to a point in time (t1) at which deployment of the main chamber 36 (volume Vg) of the curtain airbag 12 is completed in this embodiment.

$$\Delta t = (Vt/Vg - 1) \times t1$$

Furthermore, in the first comparative example, the internal pressure P0 cannot be obtained for protection against a side impact, as shown in FIG. 4. Therefore, in the first comparative example, an inflator having a larger capacity than the inflator 25 is required.

On the other hand, in the curtain airbag system 10 in which the front auxiliary chamber 40 and the delay chamber 42D are provided as described above, the inflator 25 having a relatively small capacity achieves early completion of deployment of the front main chamber 36F at the required internal pressure P0 in the event of a side impact. Furthermore, since the volume ratio Rv of the volume Vd of the front auxiliary chamber 40 and the delay chamber 42D to the volume Vg of the main chamber 36, etc. is set to 1:4, the internal pressure P2 required for protection against rollover is obtained during a period between time t4 and t5.

In the curtain airbag system 10, the curtain airbag 12 is provided with the uninflatable portion 68. Therefore, in the initial period of deployment of the curtain airbag 12, gas guided by the gas supply passage 35 in the direction of arrow Fgf is blocked by the uninflatable portion 68, and is directed toward the front main chamber 36F along the direction of arrow Fgd. The rear end portion 68R of the uninflatable portion 68 mainly blocks the gas flowing in the direction of arrow Fgf, and the rear end portion 68R and the rear portion of the lower edge portion 68L guide the gas toward the front main chamber 36F along the direction of arrow Fgd. Therefore, in the curtain airbag system 10, the velocity of flow of gas supplied to the front main chamber 36F is reduced, as compared with an arrangement in which the uninflatable portion 68 is not provided, and gas is supplied from the gas supply passage 35 directly to the front main chamber 36F. Thus, in the curtain airbag system 10 according to this embodiment, in which the curtain airbag 12 includes the front main chamber 36F and the front auxiliary chamber 40, the velocity of flow of gas directed downward in the vehicle in the course of deployment of the front main chamber 36F can be reduced or kept low.

The above point will be further explained. In the curtain airbag system 10 in which the curtain airbag 12 includes the front auxiliary chamber 40 for protection against rollover, the volume of the curtain airbag 12 is larger than that of a curtain airbag (a second comparative example) exclusively used for protection against side impact. In order to deploy the curtain airbag 12 having a relatively large volume in a short time in the event of a side impact (or achieve early completion of the deployment), the inflator 25 has a large capacity, and gas is more likely to flow downward in the initial period of deployment at a higher velocity than that of the second comparative example. To reduce the gas flow velocity, it may be considered to diffuse gas flow at a gas inlet leading to the front main chamber 36 (see arrows Fd in FIG. 6). FIG. 6 shows a third comparative example as an example in which the above idea is applied to a curtain airbag 100 including a front auxiliary chamber 40 for protection against rollover. In the curtain airbag 100 of the third comparative example, a front portion 102F of a seam 102 corresponding to the seam 56 is inclined downward, so that a gas inlet 104 to the front main chamber 36F is formed in a tapered shape. Therefore, the seam 102 projects into a longitudinally middle portion of the front main chamber 36F, resulting in an increased possibility that the front main chamber 36F is bent in the longitudinal direction.

Accordingly, in the third comparative example, it is difficult to sufficiently support reaction force at the time of occupant protection against rollover, by engaging the pillar overlapping portion 36FP with the center pillar 15. Thus, in the arrangement in which the main chamber 36 deployed above the belt line BL for prevention of interference with a side airbag functions to protect an occupant against rollover, it is difficult to arrange the main chamber 36 so as to diffuse gas flow supplied to the front main chamber 36F.

In the curtain airbag system 10 of the illustrated embodiment, on the other hand, gas flow is blocked by the uninflatable portion 68, and then guided toward the front main chamber 36F, as described above, so that the velocity of flow of gas supplied to the front main chamber 36F can be reduced. Therefore, even in the case where deployment of the curtain airbag 12 is started in a condition where an occupant seated in a front seat Sf is located at a non-normal seating position (OOP: Out Of Position), and the curtain airbag 12 (the front main chamber 36F) that is in the course of deployment strikes the head of the occupant, a load (its peak value) applied from the curtain airbag 12 to the head of the occupant can be kept lower than a specified value. Where an occupant is seated in a rear seat, the load applied to the head of the occupant when the rear main chamber 36R that is in the course of deployment strikes the head of the OOP occupant is lower than the specified value, since the amount of gas distributed to the rear main chamber 36R and rear auxiliary chamber 42 for the rear seat is smaller than the amount of gas distributed to the front main chamber 36F and front auxiliary chamber 40 for the front seat.

In the curtain airbag 12 in which the front auxiliary chamber 40 operates as a delay chamber, in particular, gas flow into the front auxiliary chamber 40 is restricted in the initial period of deployment of the curtain airbag 12, and therefore, gas fed from the large-capacity inflator 25 is supplied mainly to the main chamber 36. In this case, the velocity of flow of gas supplied to the front main chamber 36F in the initial period of deployment is likely to be further increased, as compared with the case where the front auxiliary chamber 40 does not operate as a delay chamber. Thus, in the curtain airbag system 10 in which the front auxiliary chamber 40 of the curtain airbag 12 operates as a delay chamber, the provision of the uninflatable portion 68 as described above makes it possible to effectively reduce the velocity of flow of gas supplied to the front main chamber 36F.

In the curtain airbag system 10 of the illustrated embodiment, the uninflatable portion 68 functions as a gas-flow guide portion that blocks gas flow from the gas supply passage 35, and guides the gas flow toward the front main chamber 36F. It is thus possible to provide the above-described effect by providing the gas-flow guide portion, without increasing the volume of the curtain airbag 12 as a whole. Also, the thickness of deployment of the front main chamber 36F is restricted (or reduced) by using the uninflatable portion 68 as the gas-flow guide portion.

Furthermore, since the rear end portion 68R of the uninflatable portion 68 is formed in an arc-like shape, stress concentration that would arise due to blocking of gas flow by the uninflatable portion 68 can be curbed or prevented.

Figure 5A:
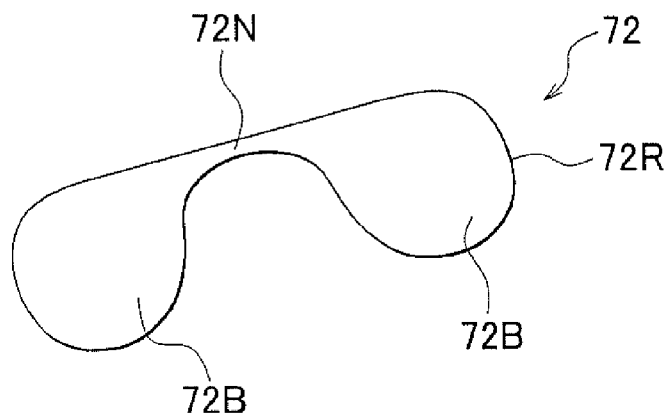
FIG. 5A is a side view showing a modified example of uninflatable portion of the curtain airbag that constitutes the curtain airbag system of the embodiment of FIG. 1.
Figure 5B:
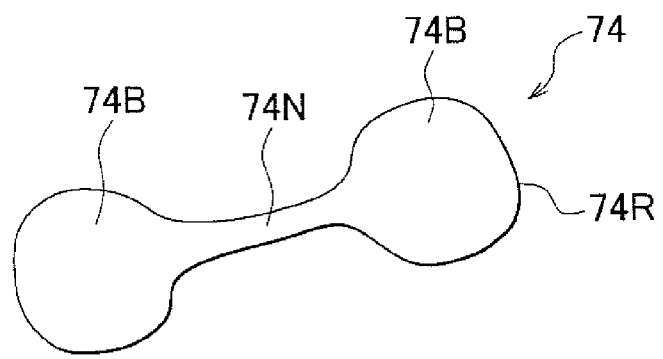
FIG. 5B is a side view showing another modified example of uninflatable portion of the curtain airbag that constitutes the curtain airbag system of the embodiment of FIG. 1.
Figure 5C:
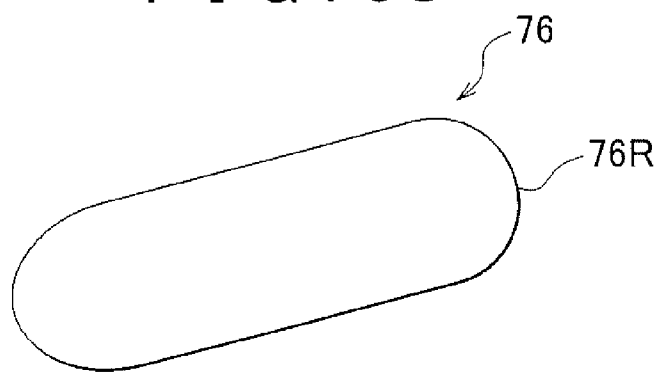
FIG. 5C is a side view showing a further modified example of uninflatable portion of the curtain airbag that constitutes the curtain airbag system of the embodiment of FIG. 1.

In the curtain airbag system 10 of the illustrated embodiment, the inflatable portion 70 is placed above the uninflatable portion 68. Thus, when the curtain airbag system 10 is actuated for protection of the head of an occupant in a rollover event, the inflatable portion 70 and the gas supply passage 35 engage with the roof side portion 18, and support reaction force resulting from the protection. Therefore, the curtain airbag system 10 provides improved protection performance when protecting the head of an occupant against rollover, as compared with a fourth comparative example that does not have a portion located above the uninflatable portion 68 and adapted to engage with the roof side portion 18 when inflated. Namely, in the arrangement in which the uninflatable portion 68 is formed as the gas-flow guide portion, a portion of the curtain airbag 12 which engages with the roof side portion 18 (so as to support reaction force) can be formed with a large longitudinal length or dimension, which contributes to improvement of protection performance when the head of an occupant is protected against rollover. In the curtain airbag system 10 of the illustrated embodiment in which the narrow portion 68N of the uninflatable portion 68 is formed along the lower edge portion 68L, in particular, the inflatable portion 70 having a relatively large diameter is deployed above the uninflatable portion 68, as compared with comparative examples as shown in FIG. 5A-FIG. 5C as described later. Namely, the large-diameter inflatable portion 70 may be placed between the front and rear broad portions 68B, depending on the shape of the uninflatable portion 68, without being influenced by the vertical positions of the semi-circular rear end portion 68R and the lower edge portion 68L having the function of guiding gas flow. In this embodiment, the inflatable portion 70 also functions as a gas channel through which gas flows to the front (toward the restrictor channel 38), as indicated by arrow Fgs in FIG. 2.

While the uninflatable portion 68 has a generally U-shaped edge portion that is open upward in the illustrated embodiment, the invention is not limited to this configuration, but modified examples as shown in FIG. 5A-FIG. 5C, for example, may be employed. An uninflatable portion 72 as shown in FIG. 5A has a narrow portion 72N located between a pair of broad portions 72B, and is shaped as if it was formed by turning the uninflatable portion 68 upside down. An uninflatable portion 74 as shown in FIG. 5B, which has a narrow portion 74N located between a pair of broad portions 74B, is formed generally symmetrically in the vertical direction. An uninflatable portion 76 as shown in FIG. 5C is formed like an ellipse having substantially the same width except its opposite end portions that are rounded into a semicircular shape. In the uninflatable portions 72, 74, 76, too, rear end portions 72R, 74R 76R that serve to block gas flow are formed in a generally semicircular shape.

While the gas-flow guide portion is in the form of one of the uninflatable portions 68, 72, 74, 76 in the illustrated embodiment and modified examples, the invention is not limited to these examples. For example, the gas-flow guide portion that blocks gas flow in the direction of arrow Fgf and guides the gas flow in the direction of arrow Fgd may be in the form of a partition cloth (tether) that is deployed under tension in the gas supply passage 35 at the front side of the gas passage 54.

While the curtain airbag 12 is provided with a delay chamber or chambers in the illustrated embodiment, the invention is not limited to this arrangement, but the curtain airbag of the invention may not be provided with any delay chamber. Namely, the restrictor channel 38 may be replaced with a gas passage having an inside diameter that exceeds 70 mm, and gas may be supplied from the gas supply passage 35 or the front main chamber 36F to the front auxiliary chamber 40 through the gas passage, so that the front auxiliary chamber 40 is deployed in the same timing as the main chamber 36.

While the present invention is applied to the automobile V having the rear seats and the rear side doors 28 in the illustrated embodiment, the invention is not limited to this application. For example, the invention may be applied to automobiles, such as a two-door automobile having no rear side doors 28, two-seater automobile having no rear seats, and an automobile having three or more rows of seats.

While the front auxiliary chamber 40 is rolled, for example, and stored in the front pillar 16 in the illustrated embodiment, the invention is not limited to this arrangement. For example, the front auxiliary chamber 40 that is rolled or folded may be folded back on a front end portion of the main chamber 36, and stored in the roof side portion 18 along with the main chamber 36, or the front auxiliary chamber 40 that is rolled or folded may be placed in a roof along a front edge of the roof. Namely, according to the invention, the airbag as a whole is not necessarily stored in the roof side portion 18, but may be otherwise arranged provided that at least the main chamber 36 is stored in the roof side portion 18.

The curtain airbag may be woven by a Jacquard loom. That is, the airbag may be a one-piece woven airbag. In the one-piece woven curtain airbag, portions to be a seam are woven together and each chamber of the curtain airbag is defined by the woven texture of the seam. A seam may be formed by sewing two foundation clothes.

Needless to say, the invention may be otherwise embodied with various changes or modifications, without departing from the principle of the invention.

What is claimed is:

1. A curtain airbag system for a vehicle, comprising:
   an inflator that generates gas; and
   a curtain airbag that is stored in a folded state in an upper edge portion of an opening of a vehicle body through which a passenger gets in or off, the curtain airbag being operable to be inflated with gas supplied from the inflator, and deployed downward from the upper edge portion of the opening of the vehicle body, wherein
   the curtain airbag comprises:
   a gas supply passage that is deployed in a cylindrical shape that extends in a longitudinal direction of the vehicle, along the upper edge portion of the opening, in the event of a side impact and rollover of the vehicle, so as to guide at least a part of the gas supplied from the inflator, toward the front of the vehicle;
   a first deployment portion to which gas is supplied from the gas supply passage in the event of a side impact or rollover of the vehicle, so that the first deployment portion is deployed downward in a vertical direction of the vehicle, so as to cover a region below the gas supply passage and above a belt line of the vehicle, the first deployment portion is a front main chamber;
   a second deployment portion to which gas is supplied from the inflator at least in the event of rollover of the vehicle, so that the second deployment portion is deployed at a vehicle front side of the first deployment portion, such that a lower end portion of the second deployment portion is located below the belt line; and
   a gas-flow guide portion located at the vehicle front side of a communicating portion that communicates with the gas supply passage and the front main chamber, and the gas-flow guide portion is located above the front main chamber, such that at least a part of the gas-flow guide portion projects downward beyond an imaginary line that extends from a lower end of the gas supply passage in the longitudinal direction of the vehicle, and the gas-flow guide portion is operable to block gas flowing toward the front of the vehicle through the gas supply passage, and guide the gas toward the front main chamber, such that most of the gas is directed toward the front main chamber.

2. The curtain airbag system according to claim 1, wherein the front main chamber comprises a front-seat development portion operable to be deployed in a cylindrical shape that extends in the longitudinal direction of the vehicle, at one side of an occupant seated in a front seat of the vehicle and above the belt line, such that a rear end portion of the front main chamber overlaps a center pillar as seen in a side view.

3. The curtain airbag system according to claim 1, wherein the gas-flow guide portion comprises an uninflatable portion of the curtain airbag which is not inflated with gas supplied from the inflator.

4. The curtain airbag system according to claim 3, wherein the uninflatable portion includes an edge portion adjacent to the gas supply passage, and the edge portion is formed in a semicircular shape as seen in a side view.

5. The curtain airbag system according to claim 3, wherein the curtain airbag further includes an inflatable portion operable to be inflated with gas supplied thereto, at a location above the uninflatable portion and at the front side of the communicating portion that communicates with the gas supply passage and the front main chamber, so that the inflatable portion and the gas supply passage overlap the upper edge portion of the opening as seen in a side view.

6. The curtain airbag system according to claim 3, wherein at least a part of the second deployment portion of the curtain airbag is deployed later than the front main chamber, in the event of a side impact or rollover of the vehicle.

7. The curtain airbag system according to claim 1, wherein the second deployment portion is a front auxiliary chamber that communicates with the front main chamber.

8. The curtain airbag system according to claim 7, wherein the curtain airbag further comprises:
   a rear main chamber operable to protect a head of a rear-seat occupant against a side impact; and
   a rear auxiliary chamber that communicates with the rear main chamber and is operable to be deployed at a vehicle front side of the rear main chamber such that a lower end portion of the rear auxiliary chamber overlaps a side door as seen in a side view.

* * * * *